United States Patent
Chang et al.

(10) Patent No.: US 8,885,098 B2
(45) Date of Patent: Nov. 11, 2014

(54) CAMERAL MODULE WITH SEALING STRUCTURE FOR PORTABLE ELECTRONIC DEVICES

(71) Applicants: Shenzhen Futaihong Precision Industry Co., Ltd., Shenzhen (CN); FIH (Hong Kong) Limited, Kowloon (HK)

(72) Inventors: Chih-Wei Chang, New Taipei (TW); Peng Niu, Shenzhen (CN)

(73) Assignee: ScienBiziP Consulting (Shenzhen) Co., Ltd., Guangdong (CN)

( * ) Notice: Subject to any disclaimer, the term of this patent is extended or adjusted under 35 U.S.C. 154(b) by 0 days.

(21) Appl. No.: 13/873,413

(22) Filed: Apr. 30, 2013

(65) Prior Publication Data

US 2014/0022450 A1    Jan. 23, 2014

(30) Foreign Application Priority Data

Jul. 20, 2012    (CN) .......................... 2012 1 2523550

(51) Int. Cl.
*H04N 5/225*    (2006.01)

(52) U.S. Cl.
CPC ............ *H04N 5/2252* (2013.01); *H04N 5/2257* (2013.01)
USPC .......................................................... 348/374

(58) Field of Classification Search
CPC ............................. H04N 5/2252; H04N 5/2257
USPC ........................................................ 348/274
See application file for complete search history.

(56) References Cited

U.S. PATENT DOCUMENTS

| 7,686,524 B2 * | 3/2010 | Takizawa et al. ............. 396/439 |
| 7,967,514 B2 * | 6/2011 | Cao ................................... 396/448 |
| 2002/0121190 A1 * | 9/2002 | Nakadate ......................... 92/168 |

* cited by examiner

*Primary Examiner* — Gary C Vieaux
(74) *Attorney, Agent, or Firm* — Novak Druce Connolly Bove + Quigg LLP

(57) ABSTRACT

A sealing structure includes a housing and a camera module. The housing defines an annular groove. The cameral module is assembled in the housing. The camera module includes a closed, wave-shaped rib, which includes a plurality of waves. The rib is engaged with a wall of the annular groove to create a seal.

8 Claims, 4 Drawing Sheets

CAMERAL MODULE WITH SEALING STRUCTURE FOR PORTABLE ELECTRONIC DEVICES

BACKGROUND

1. Technical Field

The present disclosure relates to cameral modules, and particularly to a cameral module with a sealing structure for portable electronic devices.

2. Description of Related Art

Camera apparatus are included in most portable electronic devices, such as mobile phones, or personal digital assistants, having an imaging function (e.g., still and/or video photography). A conventional camera apparatus is usually held in a housing of the portable electronic device.

However, a gap exists between the cameral module and the housing of the electronic device. In such cases, dust can enter the housing through the gap and damage the inside of the electronic device.

Therefore, there is room for improvement within the art.

BRIEF DESCRIPTION OF THE DRAWINGS

Many aspects of the embodiments can be better understood with reference to the drawings. The components in the drawings are not necessarily drawn to scale, the emphasis instead being placed upon clearly illustrating the principles of the exemplary cameral module and portable electronic device using the cameral module. Moreover, in the drawings like reference numerals designate corresponding parts throughout the several views. Wherever possible, the same reference numbers are used throughout the drawings to refer to the same or like elements of an embodiment.

DETAILED DESCRIPTION

Figure 1:
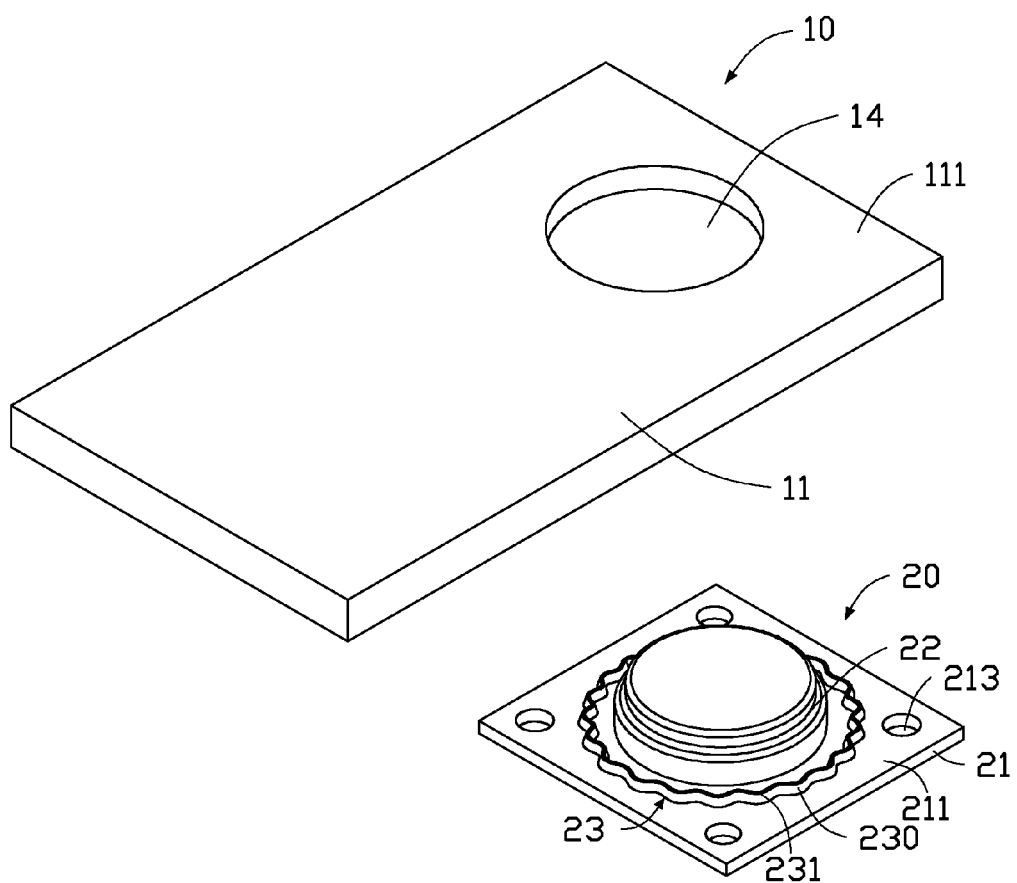
FIG. 1 is an exploded view of one embodiment of a cameral module used in a portable electronic device.
Figure 2:
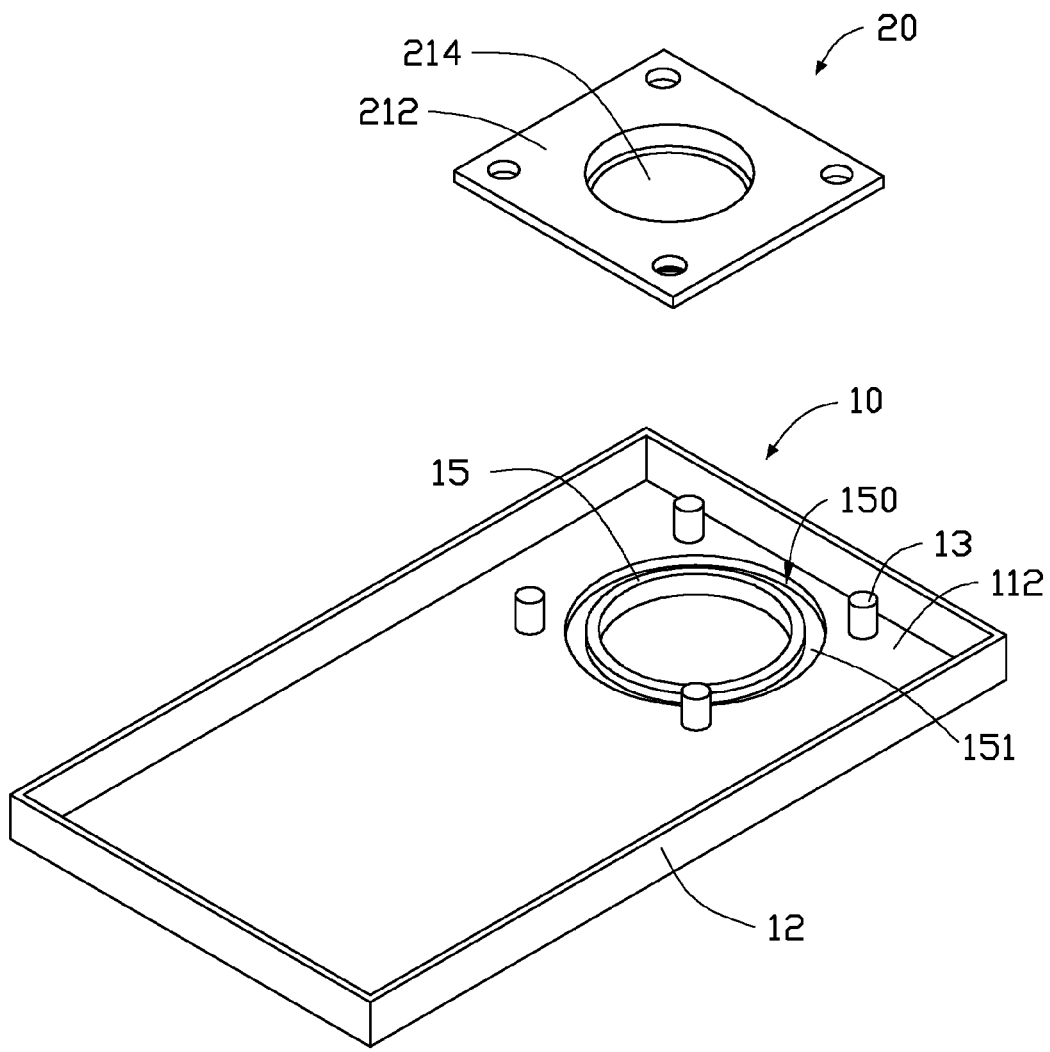
FIG. 2 is similar to FIG. 1, but viewed from another aspect.

FIGS. 1 and 2 show an exemplary embodiment of a cameral module 20 which can be used in a portable electronic device, such as a cellular phone or any electronic device where a chip card is required. The portable electronic device includes a housing 10. The cameral module 20 is assembled in the housing 10.

Figure 4:
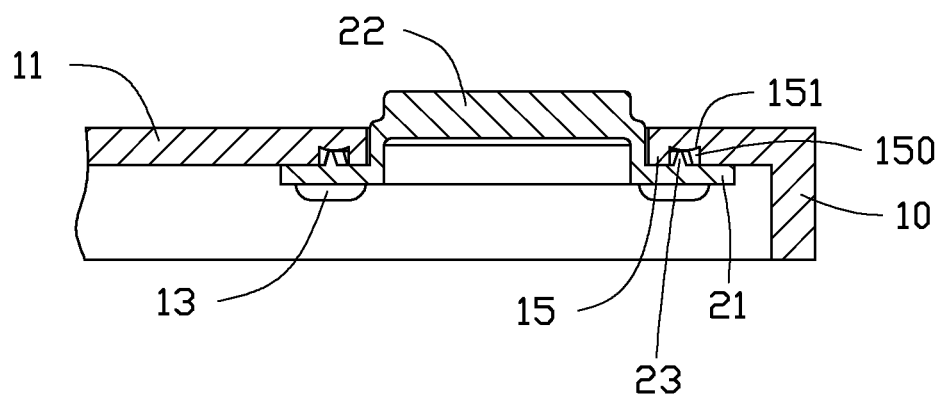
FIG. 4 is a cross sectional view of the cameral module of FIG. 3 taken along line IV-IV.

The housing 10 may be a portion of the portable electronic device or a separate element fixed to the portable electronic device. In the exemplary embodiment, the housing 10 is a top portion or a bottom portion of the portable electronic device. The housing 10 includes a base plate 11 and a peripheral wall 12 integrated with the base plate 11. In the exemplary embodiment, the base plate 11 is substantially rectangular. The peripheral wall 12 perpendicularly extends from the peripheral edges of the base plate 11. The base plate 11 includes an outer surface 111 and an inner surface 112 and defines a circular through hole 14 in the outer surface 111. An annular ring 15 is positioned around the through hole 14 in the inner surface 112. An annular groove 150 with a bottom wall 151 is defined outside of the annular ring 15. Referring to FIG. 4, the bottom wall 151 is a curved surface projecting into the annular groove 150. A plurality of posts 13 are positioned around the annular ring 15. In the exemplary embodiment, there are four posts 13.

The cameral module 20 includes a mounting portion 21 and a lens portion 22. The mounting portion 21 is planar, and includes a first surface 211 and a second surface 212. The first surface 211 defines a plurality of post holes 213 for corresponding to the posts 13 on the housing 10. In the exemplary embodiment, there are four post holes 213 defined in the mounting portion 21. The lens portion 22 is positioned near a central area of the first surface 211 of the mounting portion 21. A closed, wave-shaped rib 23 surrounds the lens portion 22 on the first surface 211. The rib 23 has a plurality of wave sections 230. Accordingly, opposite inner and outer surfaces of the rib 23 has a plurality of peaks and valleys. The rib 23 has a top surface 231. The rib 23 is received in the annular groove 150. The opposite inner and outer surfaces of the rib 23 abut against opposite sidewalls of the annular groove 150, and the top surface 231 of the rib 23 abuts against the curved bottom wall 151. The second surface 212 of the mounting portion 21 defines a receiving cavity 214 configured for accommodating optical elements and image sensors.

Figure 3:
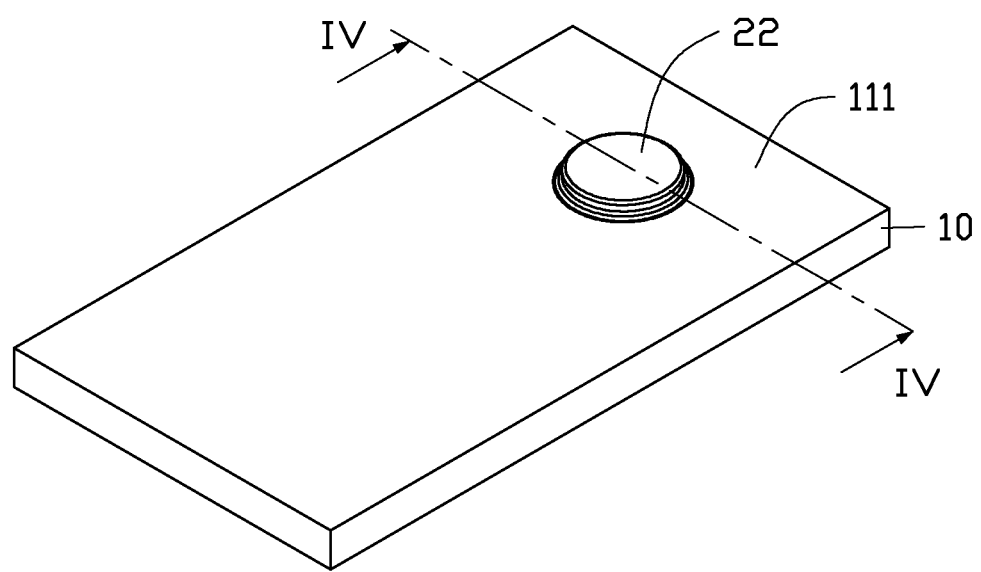
FIG. 3 is an assembled view of the cameral module attached to the portable electronic device.

During assembly, referring to FIGS. 3-4, the mounting portion 21 is located on the inner surface 112 of the housing 10, and the lens portion 22 extends through the through hole 14 of the housing 10. The lens portion 22 is exposed from the outer surface 111 of the housing 10. The rib 23 is retained in the annular groove 150. The top surface 231 of the rib 23 abuts against the curved bottom wall 151. The posts 13 are engaged in the post holes 213, and are mounted to each other by, e.g., hot melting. Thus, the assembly process of attaching the cameral module 20 to the housing 10 is finished. In the present exemplary embodiment, the rib 23 and the annular groove 15 define a sealing structure. Since the top surface 231 of the rib 23 is pointed, and the top surface 231 of the rib 23 abuts against the curved bottom wall 151, a length of the top surface 231 forms an elongated sealing connection because of the wave-shaped rib 23. Thus, dust prevented from passing through the top surface 231. Even if dust enters into the rib 23, the dust may be easily accumulated on concave spaces of the arcuate sections 230. Accordingly, the cameral module 20 and the portable electronic device are protected from dust entering via the sealing structure.

Although numerous characteristics and advantages of the exemplary disclosure have been set forth in the foregoing description, together with details of the structure and function of the disclosure, the disclosure is illustrative only, and changes may be made in detail, especially in the matters of shape, size, and arrangement of parts within the principles of the disclosure to the full extent indicated by the broad general meaning of the terms in which the appended claims are expressed.

What is claimed is:

1. A sealing structure comprising:
a housing defining an annular groove with a bottom wall;
a cameral module assembled in the housing, the camera module including a closed, wave-shaped rib, the rib including a plurality of wave sections, the rib being engaged with the bottom wall of the annular groove to create a seal.

2. The sealing structure of claim 1, wherein the bottom wall is a curved surface projecting into the annular groove.

3. A portable electronic device, comprising:
a housing defining a through hole and an annular groove positioned around the through hole;
a cameral module attached to the housing, the camera module including a closed, wave-shaped rib, the rib including a plurality of wave sections, the rib being engaged with the annular groove to create a seal.

4. The portable electronic device of claim 3, wherein the housing includes a base plate and a peripheral wall integrated with the base plate, the base plate is substantially rectangular, the peripheral wall perpendicularly extends from the peripheral edges of the base plate.

5. The portable electronic device of claim 4, wherein a plurality of posts are positioned around an annular ring, the cameral module includes a mounting portion, and a lens portion, the mounting portion defines a plurality of post holes corresponding to the posts on the housing.

6. The portable electronic device of claim 5, wherein the ring is positioned around the through hole, and is formed between the through hole and the annular groove, the lens portion is positioned near a central area of the mounting portion.

7. The portable electronic device of claim 6, wherein the rib is positioned around the lens portion, the wave sections are connected in a closed circle.

8. The portable electronic device of claim 7, wherein the annular groove has a curved bottom wall, the rib has a pointed top surface, and the pointed top surface of the rib abuts against the curved bottom wall.

* * * * *